US012481959B1

(12) United States Patent
Nellore et al.

(10) Patent No.: US 12,481,959 B1
(45) Date of Patent: Nov. 25, 2025

(54) OPTIMIZING ORDER FULFILLMENT PROCESSES

(71) Applicant: Coupang Corp., Seoul (KR)

(72) Inventors: Venkataraja Nellore, Seoul (KR); Harshal Wanjari, Seattle, WA (US); Zhixin Liu, Seoul (KR); Manish Garg, Seoul (KR); Vikram Balaji, Seoul (KR); Jiung Lee, Seoul (KR); Paul Stroup, Seattle, WA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 18/937,884

(22) Filed: Nov. 5, 2024

(51) Int. Cl.
*G06Q 10/087* (2023.01)

(52) U.S. Cl.
CPC .................... *G06Q 10/087* (2013.01)

(58) Field of Classification Search
CPC .. G06Q 10/087; G06Q 10/08; G06Q 10/0833; G06Q 10/06316
See application file for complete search history.

(56) References Cited

U.S. PATENT DOCUMENTS

| | | | | |
|---|---|---|---|---|
| 7,693,758 B1 * | 4/2010 | Bacco | ................... | G06Q 20/203 705/28 |
| 7,751,928 B1 * | 7/2010 | Antony | ................. | G06Q 10/087 700/214 |
| 9,487,356 B1 * | 11/2016 | Aggarwal | .............. | B65G 1/137 |
| 10,878,377 B1 | 12/2020 | Kim et al. | | |
| 10,997,648 B2 | 5/2021 | Kim et al. | | |
| 2018/0211347 A1 * | 7/2018 | Chen | ..................... | G05D 1/0217 |
| 2020/0239232 A1 * | 7/2020 | Johnson | ............... | G05D 1/0291 |
| 2020/0262650 A1 * | 8/2020 | Agarwal | ................ | G06Q 10/00 |
| 2021/0245956 A1 * | 8/2021 | Douglas | ............... | B65G 1/1375 |
| 2024/0330846 A1 * | 10/2024 | Rao Karikurve | .... | G06Q 10/087 |
| 2024/0403929 A1 * | 12/2024 | Drerup | ............. | G06Q 10/06395 |

\* cited by examiner

*Primary Examiner* — Florian M Zeender
*Assistant Examiner* — Vanessa Deligi
(74) *Attorney, Agent, or Firm* — Fish & Richardson P.C.

(57) ABSTRACT

A method of order fulfillment at a fulfillment center includes: identifying a first number of available collection units available for processing a corresponding first number of orders, identifying, from a list of unfulfilled orders at the fulfillment center, a second number of unfulfilled orders each of which is to be assigned to one of the first number of available collection units for packing, where the second number is selected such that an efficiency metric, which is based on (i) a total distance traversed by a collection device to collect the component items corresponding to the second number of unfulfilled orders from the storage area and (ii) a third number of component items collected using the collection device traversing the total distance, satisfies a threshold condition, and generating a signal to assign one or more particular collection devices to collect the third number of component items.

20 Claims, 9 Drawing Sheets

Aisle A    Aisle B    Aisle C    Aisle D    Aisle E

Aisle F    Aisle G    Aisle H    Aisle I    Aisle J

FIG. 5

| A1 |    |    |    | A2 |
|----|----|----|----|----|
|    | A3 | A4 |    |    |
|    | A5 |    |    |    |
|    |    |    |    | A6 |
|    |    |    |    |    |
| A7 |    |    |    | A8 |
|    |    | A9 |    |    |
| A10|    |    | A11|    |
|    | A12|    |    |    |
|    |    |    |    |    |

331

| B1 |    | B2 |    | B3 |
|----|----|----|----|----|
|    | B4 | B5 |    | B6 |
| B7 |    | B8 |    |    |
| B8 | B9 |    |    |    |
|    |    | B10| B11|    |
| B12| B13| B14| B15| B16|
| B17| B18| B19|    |    |
| B20|    |    | B21|    |
|    | B22|    |    |    |
|    |    | B23| B24| B25|

332

|    |    | C1 |    | C2 |
|----|----|----|----|----|
|    |    |    |    |    |
| C3 |    | C4 |    |    |
|    | C5 |    |    |    |
|    |    |    |    |    |
|    |    |    |    |    |
|    |    |    |    |    |
|    |    |    |    |    |
|    |    |    |    |    |
|    |    |    |    |    |

333

Aisle A

Aisle B

Aisle C

Aisle D

Aisle E

Aisle F

Aisle G

Aisle H

Aisle I

Aisle J

FIG. 7

| A1 | A13 | A14 | A15 | A2 |
|---|---|---|---|---|
| A16 | A3 | A4 | | |
| | A5 | | | |
| | | A17 | A18 | A6 |
| | A19 | A20 | A21 | |
| A7 | | | | A8 |
| | | A9 | | |
| A10 | A22 | | A11 | |
| | A12 | | | |
| | | | A23 | |

331

| B1 | B26 | B2 | B27 | B3 |
|---|---|---|---|---|
| B28 | B4 | B5 | B29 | B6 |
| B7 | B30 | B8 | B31 | B32 |
| B8 | B9 | B33 | B34 | B35 |
| B36 | | B10 | B11 | |
| B12 | B13 | B14 | B15 | B16 |
| B17 | B18 | B19 | | |
| B20 | B37 | | B21 | |
| | B22 | | B38 | |
| | | B23 | B24 | B25 |

332

| C6 | C7 | C1 | C8 | C2 |
|---|---|---|---|---|
| C9 | C10 | C11 | C12 | C13 |
| C3 | | C4 | C14 | |
| | C5 | C15 | | |
| C16 | C17 | | C18 | |
| C19 | C20 | C21 | | C22 |
| | C23 | C24 | C25 | |
| | | | | |
| | | C26 | | |
| | | | | |

333

OPTIMIZING ORDER FULFILLMENT PROCESSES

TECHNICAL FIELD

The present disclosure relates to a system for order fulfilment at a fulfillment center, and more particularly, a computerized method of order fulfillment at the fulfillment center.

BACKGROUND

The efficiency of fulfillment center (FC) operations is critical to meeting the increasing demands from online customers and ensuring timely delivery of products to the customers. One essential process in FCs is order consolidation through rebinning, which involves grouping items from multiple orders together for efficient packing and shipping.

SUMMARY

The present disclosure is directed to a method of order fulfillment at a fulfillment center.

According to one aspect of the subject matter described in this application, a method of order fulfillment at a fulfillment center can include identifying, within a first order collection area of the fulfillment center, a first number of available collection units available for processing a corresponding first number of orders, identifying, from a list of unfulfilled orders at the fulfillment center, a second number of unfulfilled orders, each of which is to be assigned to one of the first number of available collection units for packing, wherein a fulfillment process for each order includes: (i) collecting one or more component items from a storage area comprising multiple aisles, each aisle having a plurality of locations for storing order-items, and (ii) delivering collected one or more component items to a corresponding collection unit, and wherein the second number of unfulfilled orders are selected such that an efficiency metric associated with the second number of unfulfilled orders satisfies a threshold condition, the efficiency metric being based on (i) a total distance traversed by a collection device to collect the component items corresponding to the second number of unfulfilled orders from the storage area, and (ii) a third number of component items collected using the collection device traversing the total distance, generating a signal to assign one or more particular collection devices from a pool of candidate collection devices to collect the third number of component items, wherein the particular collection devices are assigned based on location information corresponding to each collection device in the pool of candidate collection devices, and assigning at least a subset of the first number of available collection units to receive each of the third number of component items corresponding to the second number of unfulfilled orders.

Implementations according to this aspect can include one or more of the following features. For example, the efficiency metric can also be based on a total time associated with traversing the total distance and delivering the collected third number of component items to the assigned collection unit.

In some implementations, the location information corresponding to each collection device in the pool of candidate collection devices can be derived based on a last-known location of the corresponding collection device. In some implementations, the location information corresponding to each collection device in the pool of candidate collection devices can be received from the corresponding collection device in response to transmitting a request for the location information.

In some examples, the efficiency metric can be recalculated upon detection of occurrence of predetermined events. In some examples, the predetermined events can include reaching of a capacity associated with a collection device. In some implementations, the method can further include iterating the method until each of the first number of available collection units is assigned to at least one of the second number of unfulfilled orders.

According to another aspect of the subject matter described in this application, a computer-implemented system for order fulfillment at a fulfillment center can include at least one processor, and memory coupled to the at least one processor and storing instructions that, based on being executed by the at least one processor, perform operations. The operations can include identifying, within a first order collection area of the fulfillment center, a first number of available collection units available for processing a corresponding first number of orders, identifying, from a list of unfulfilled orders at the fulfillment center, a second number of unfulfilled orders, each of which is to be assigned to one of the first number of available collection units for packing, wherein a fulfillment process for each order includes: (i) collecting one or more component items from a storage area comprising multiple aisles, each aisle having a plurality of locations for storing order-items, and (ii) delivering collected one or more component items to a corresponding collection unit, and wherein the second number of unfulfilled orders are selected such that an efficiency metric associated with the second number of unfulfilled orders satisfies a threshold condition, the efficiency metric being based on (i) a total distance traversed by a collection device to collect the component items corresponding to the second number of unfulfilled orders from the storage area, and (ii) a third number of component items collected using the collection device traversing the total distance, generating a signal to assign one or more particular collection devices from a pool of candidate collection devices to collect the third number of component items, wherein the particular collection devices are assigned based on location information corresponding to each collection device in the pool of candidate collection devices, and assigning at least a subset of the first number of available collection units to receive each of the third number of component items corresponding to the second number of unfulfilled orders.

Implementations according to this aspect can include one or more of the following features. For example, the efficiency metric can also be based on a total time associated with traversing the total distance and delivering the collected third number of component items to the assigned collection unit.

In some implementations, the location information corresponding to each collection device in the pool of candidate collection devices cab be derived based on a last-known location of the corresponding collection device. In some implementations, the location information corresponding to each collection device in the pool of candidate collection devices can be received from the corresponding collection device in response to transmitting a request for the location information.

In some examples, the efficiency metric can be recalculated upon detection of occurrence of predetermined events. In some examples, the predetermined events can include reaching of a capacity associated with a collection device. In some implementations, the operations can further include iterating the operations until each of the first number of available collection units is assigned to at least one of the second number of unfulfilled orders.

According to another aspect of the subject matter described in this application, a non-transitory recording medium storing a program, where execution of the program can cause one or more computers to perform operations comprising identifying, within a first order collection area of the fulfillment center, a first number of available collection units available for processing a corresponding first number of orders, identifying, from a list of unfulfilled orders at the fulfillment center, a second number of unfulfilled orders, each of which is to be assigned to one of the first number of available collection units for packing, wherein a fulfillment process for each order includes: (i) collecting one or more component items from a storage area comprising multiple aisles, each aisle having a plurality of locations for storing order-items, and (ii) delivering collected one or more component items to a corresponding collection unit, and wherein the second number of unfulfilled orders are selected such that an efficiency metric associated with the second number of unfulfilled orders satisfies a threshold condition, the efficiency metric being based on (i) a total distance traversed by a collection device to collect the component items corresponding to the second number of unfulfilled orders from the storage area, and (ii) a third number of component items collected using the collection device traversing the total distance, generating a signal to assign one or more particular collection devices from a pool of candidate collection devices to collect the third number of component items, wherein the particular collection devices are assigned based on location information corresponding to each collection device in the pool of candidate collection devices, and assigning at least a subset of the first number of available collection units to receive each of the third number of component items corresponding to the second number of unfulfilled orders.

Implementations according to this aspect can include one or more of the following features. For example, the efficiency metric can also be based on a total time associated with traversing the total distance and delivering the collected third number of component items to the assigned collection unit.

In some implementations, the location information corresponding to each collection device in the pool of candidate collection devices can be derived based on a last-known location of the corresponding collection device. In some implementations, the location information corresponding to each collection device in the pool of candidate collection devices can be received from the corresponding collection device in response to transmitting a request for the location information.

In some examples, the efficiency metric can be recalculated upon detection of occurrence of predetermined events, and the predetermined events can include reaching of a capacity associated with a collection device. In some examples, the operations can further include iterating the operations until each of the first number of available collection units is assigned to at least one of the second number of unfulfilled orders.

BRIEF DESCRIPTION OF THE DRAWINGS

FIG. 5 is a diagram illustrating an example of sorting apparatuses each receiving a corresponding order set.

FIG. 7 is a diagram illustrating an example of the sorting apparatuses with the remaining cells filled through the selection process of FIG. 6.

DETAILED DESCRIPTION

Figure 1:
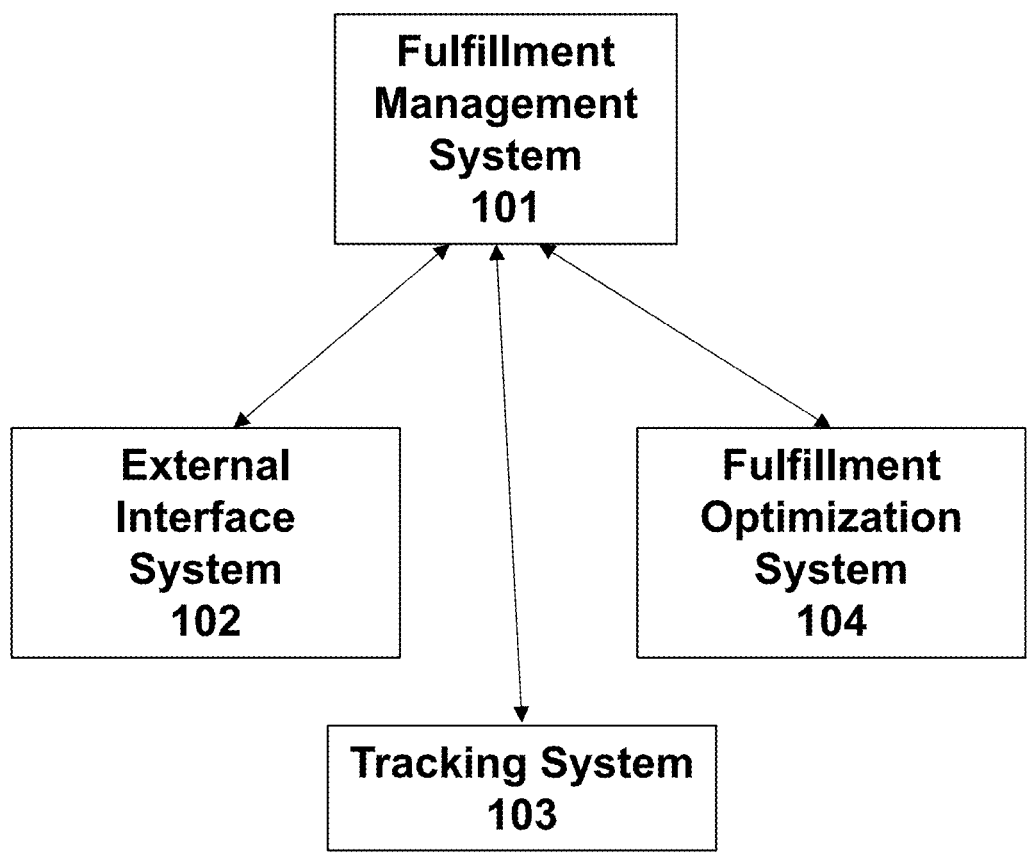
FIG. 1 is a diagram illustrating an example of a network comprising computerized systems for communications enabling shipping, transportation, and logistics operations.

In some specific scenarios, the current mode of operations within certain fulfillment center (FC) network reveals inefficiencies, particularly in processes like rebinning and order consolidation. For example, approximately 70% of the volume in an FC network may undergo the rebin process for order consolidation, indicating a substantial load on the system that can impact operational efficiency. Additionally, in these scenarios, the outbound (OB) process in the FC may allocate around 23% of man-hours to picking and another 9% to rebinning. These observations highlight the labor-intensive nature of these operations and suggest areas where improvements could be made.

One of the primary constraints in the current rebinning process is the creation of "hard batches." These batches are formed based on the availability of a group of free cells within the rebin wall-a structure used for temporarily holding items during consolidation. Once a batch is created, the shipments within it are rigidly allocated to specific rebin cells. This inflexibility prevents dynamic adjustment or optimization of batches, such as incorporating new shipments that could improve processing efficiency.

Another constraint is the "wall level cell understanding," where new batches are only created after all cells of the rebin wall from the previous batch are cleared. This means that if a batch contains 20 shipments, the next batch can only be initiated once all those shipments are fully packed and the rebin wall is entirely freed up. This sequential processing leads to underutilization of the rebin wall, with its utilization rate often being low, e.g., approximately 67%. This bottleneck not only slows down operations but also limits the throughput capacity of the FC.

Additionally, the inefficiency in picking processes exacerbates the problem. The current system does not allow for the optimization of batches by integrating newer shipments with better distance traveled per picked unit (DPU). In some examples, alternative metrics such as walk time per unit (WTPU) and pick time per unit (PTPU) may be employed in place of DPU. As a result, the hourly throughput (HTP) rate for multi-item orders is nearly half that of single-item orders, indicating a significant gap in operational efficiency.

These constraints collectively contribute to suboptimal performance in the FC network's rebinning process. Addressing these issues is crucial for improving overall efficiency, reducing labor costs, and enhancing the capacity and responsiveness of fulfillment center operations.

The present disclosure is directed to address the above-referenced issues by strategically optimizing pick density and minimizing travel distances for workers within the storage area (picking zone). By identifying orders and clustering items based on their proximity, pick clusters can be created to maximize the number of items picked within a defined area. These clusters can be assigned to workers based on a metric that evaluates their proximity to the clusters, ensuring that those closest to the clusters are tasked with picking, thereby reducing travel time. Additionally, picking tasks can be dynamically reorganized to prioritize areas with higher pick density, further streamlining the process. This approach not only accelerates the picking and rebin process but also enhances overall operational efficiency, reducing delays and optimizing the use of resources.

FIG. 1 is a diagram illustrating an example of a network comprising computerized systems for communications enabling shipping, transportation, and logistics operations. A system 100 can include computerized systems for communications enabling shipping, transportation, and logistics operations. For example, the system 100 can include a variety of systems, each of which can be connected to one another via one or more networks. The systems can also be connected to one another via a direct connection, for example, using a cable.

The depicted systems include a fulfillment management (FM) system 101, an external interface system 102, a tracking system 103, and a fulfillment optimization (FO) system 104.

The FM system 101 can be implemented as a computer system that monitors order status and delivery status. For example, the FM system 101 can determine whether an order is past its Promised Delivery Date (PDD) and can take appropriate action, including initiating a new order, reshipping the items in the non-delivered order, canceling the non-delivered order, initiating contact with the ordering customer, or the like. The FM system 101 can also monitor other data, including output (such as a number of packages shipped during a particular time period) and input (such as the number of empty cardboard boxes received for use in shipping). The FM system 101 can also act as a gateway between different devices in system 100, enabling communication (e.g., using store-and-forward or other techniques) between devices such as external interface system 102 and FO system 104.

The external interface system 102 can be implemented as a computer system that enables external users to interact with one or more systems in the system 100. For example, in implementations where the system 100 enables the presentation of systems to enable users to place an order for an item, the external interface system 102 can be implemented as a web server that receives search requests, presents item pages, and solicits payment information. For example, the external interface system 102 can be implemented as a computer or computers running software for receiving and processing requests from external devices, acquire information from databases and other data stores based on those requests, and provide responses to the received requests based on acquired information.

The tracking system 103 can be implemented as a computer system that receives, stores, and forwards information regarding the location of packages containing products ordered by customers. In some implementations, the tracking system 103 can request or store information from web servers operated by shipping companies that deliver packages containing products ordered by customers.

The fulfillment optimization (FO) system 104 can be implemented as a computer system that stores information for customer orders from other systems (e.g., the external interface system 102 and/or the tracking system 103). The FO system 104 can also store information describing where particular items are held or stored. For example, certain items may be stored only in one fulfillment center, while certain other items may be stored in multiple fulfillment centers. In some implementations, certain fulfilment centers may be designed to store only a particular set of items (e.g., fresh produce or frozen products). The FO system 104 can store this information as well as associated information (e.g., quantity, size, date of receipt, expiration date, etc.).

The FO system 104 can also calculate a corresponding PDD (promised delivery date) for each product. The PDD, in some implementations, can be based on one or more factors. For example, the FO system 104 can calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some implementations, the FO system 104 can determine a PDD for each product on a periodic basis (e.g., hourly) and store it in a database for retrieval or sending to other systems (e.g., the external interface system 102, the FM system 101, the tracking system 103). In some implementations, the FO system 104 can receive electronic requests from one or more systems (e.g., the external interface system 102, the FM system 101, the tracking system 103) and calculate the PDD on demand.

Figure 2:
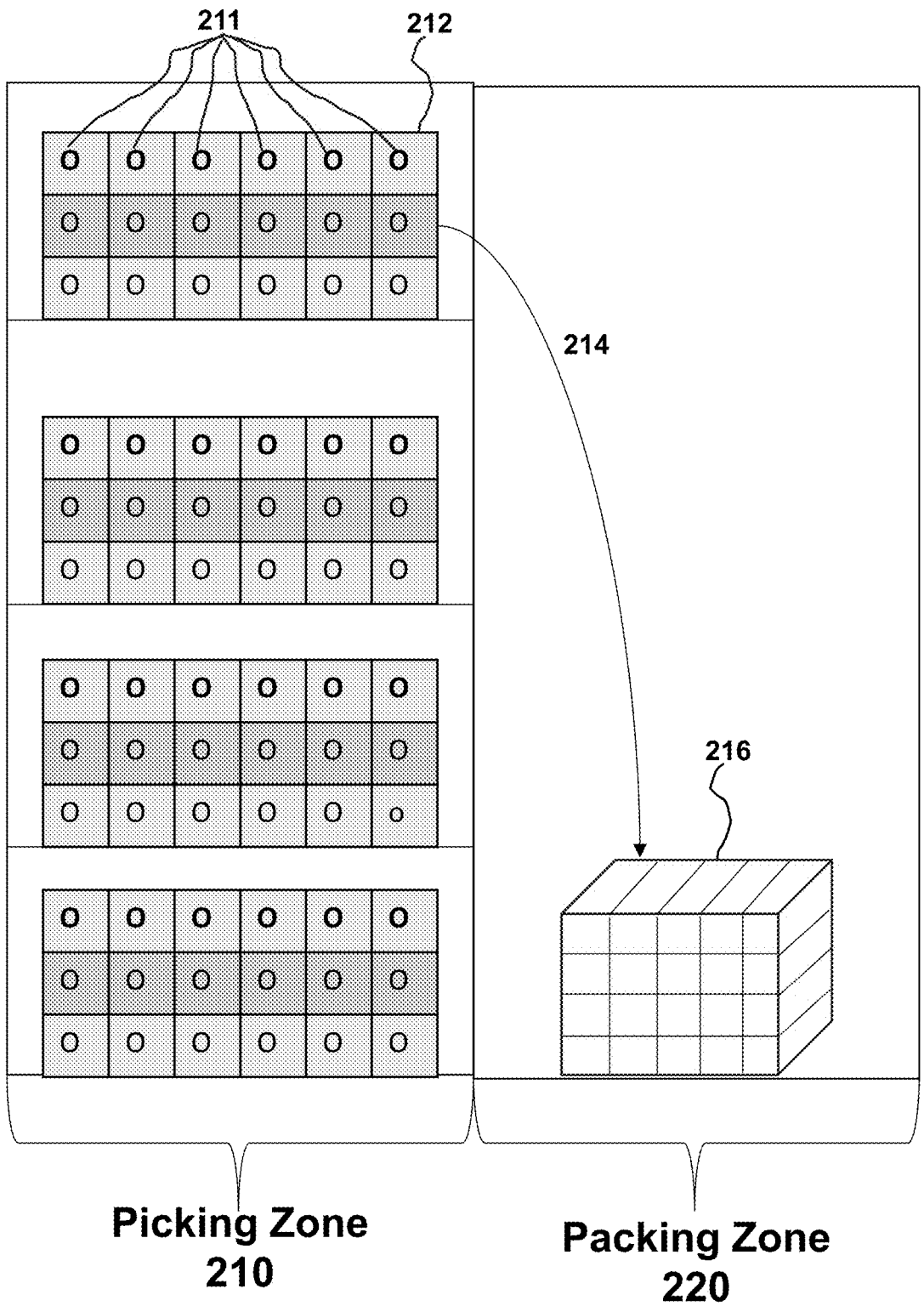
FIG. 2 is a diagram illustrating an example of a fulfillment center configured to utilize disclosed computerized systems.

FIG. 2 is a diagram illustrating an example of a fulfillment center 200. The fulfillment center 200 is an example of a physical location that stores items for shipping to customers when ordered. The Fulfillment center (FC) 200 can be divided into multiple zones, each of which are depicted in FIG. 2. These "zones," in some implementations, can be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some implementations.

A picking zone 210 can be an area of the FC 200 where items 211 are stored on storage units 212. In some implementations, the storage units 212 can comprise one or more of physical shelving, bookshelves, boxes, totes, refrigerators, freezers, cold stores, or the like. In some implementations, the picking zone 210 can be organized into multiple floors. In some implementations, workers or machines can move items into picking zone 210 in multiple ways, including, for example, a forklift, an elevator, a conveyor belt, a cart, a handtruck, a dolly, an automated robot or device, or manually.

A picker may receive an instruction to place (or "stow") the items in particular spots in the picking zone 210, such as a particular space on a storage unit 212. For example, a picker can scan the item using a mobile device. The device can indicate where the picker should stow the item, for example, using a system that indicate an aisle, shelf, and location. The device can then prompt the picker to scan a barcode at that location before stowing the item in that location. The device can send (e.g., via a wireless network) data to a computer system indicating that the item has been stowed at the location by the user using the device.

Once a user places an order, a picker can receive an instruction on the device to retrieve one or more items 211 from the storage unit 212. The picker can retrieve the item 211, scan a barcode on the item 211, and place it on a transport mechanism 214. While the transport mechanism 214 is represented as a slide, in some implementations, the transport mechanism can be implemented as one or more of a conveyor belt, an elevator, a cart, a forklift, a handtruck, a dolly, a cart, or the like. The item 211 may then arrive at the packing zone 220.

The packing zone 220 can be an area of the FC 200 where items are received from the picking zone 210 and packed into boxes or bags for eventual shipping to customers. In the packing zone 220, a worker assigned to receiving items (a "rebin worker") will receive the item 211 from the picking zone 210 and determine what order it corresponds to. For example, the rebin worker can use a device, such as the computer, to scan a barcode on the item 211. The computer can indicate visually which order item 211 is associated with. This can include, for example, a space or "cell" on a wall 216 that corresponds to an order. Once the order is complete (e.g., because the cell contains all items for the order), the rebin worker can indicate to a packing worker (or "packer") that the order is complete. The packer can retrieve the items from the cell and place them in a box or bag for shipping.

Figure 3:
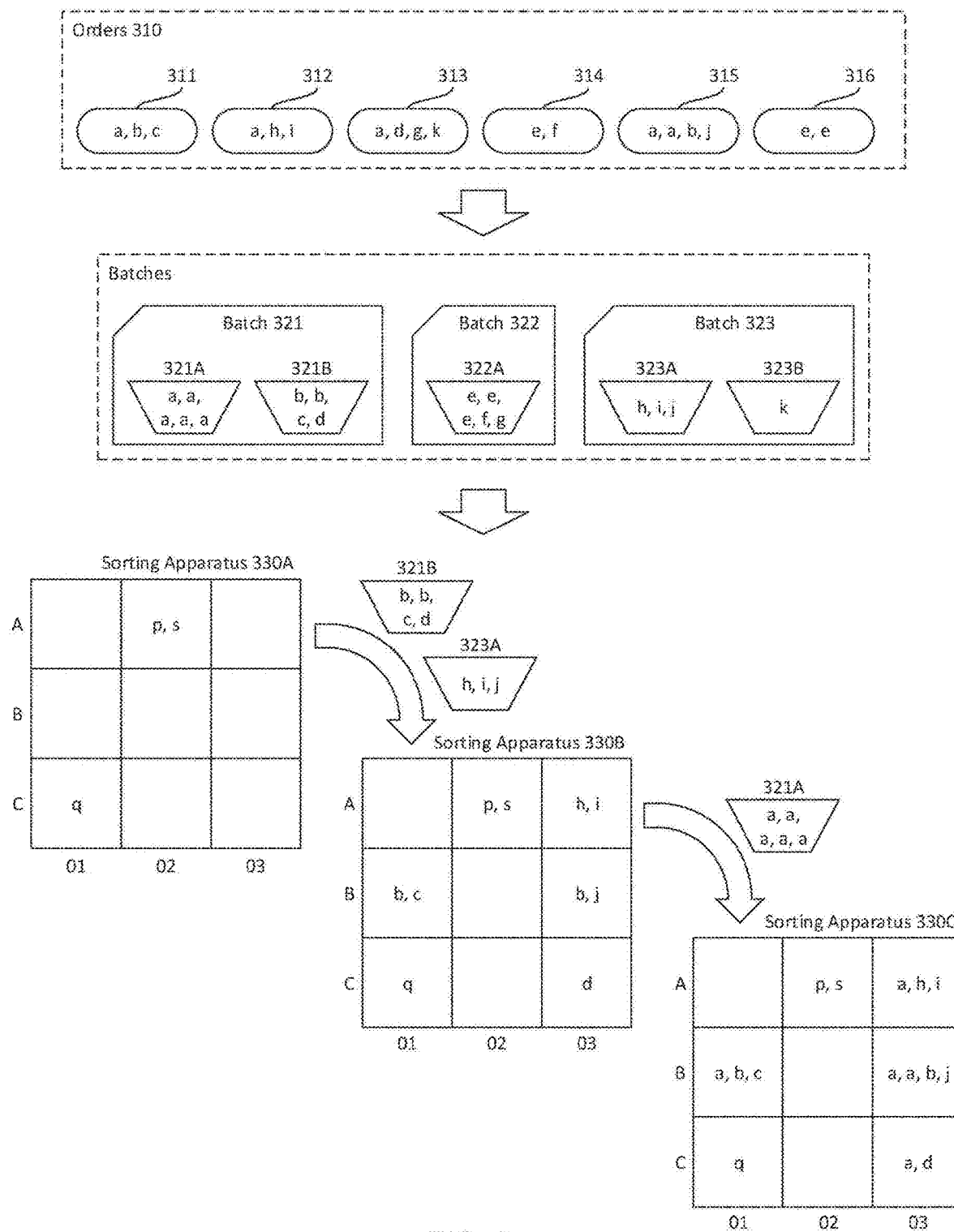
FIG. 3 is a diagram illustrating an example of an order fulfillment process.

FIG. 3 is a diagram illustrating an example of an order fulfillment process 300. The order fulfillment process 300 can begin when customers places orders via external interface system 102. In some implementations, the FO system 104 can aggregate the orders for a predetermined period of time until an order set 310 is created, comprising of orders 311-316. Each of the orders 311-316 can include any combination of items (e.g., items a-k). For example, the order 311 includes items a, b, and c; the order 312 includes items a, h, and i; order 313 includes items a, d, g, and k; order 314 includes items e and f; order 315 includes items a, a, b, and j (i.e., two of item a and one each of items b and j); and order 316 includes two of item e, as depicted in FIG. 3.

In order to expedite the picking process described above, the FO system 104, in some implementations, can reorganize the purchased items in orders 311-316 into one or more batches 321-323, based on, for example, a location of each item within the FC 200. For example, as depicted in FIG. 3, the batch 321 includes five of item a, two of item b, and one each of items c and d; the batch 322 includes three of item e and one each of items f and g; and the batch 323 includes one each of items h, i, j, and k. In some implementations, the FO system 104 can assign each batch to different workers (e.g., pickers), who can then pick each item in their respective batch from picking zone 210. Although pickers are described as human, it should be noted that pickers may be implemented as automated machines and not limited to the examples described herein. For ease of explanation without causing ambiguity, pickers are described as individuals hereinafter unless specifically stated otherwise.

In some implementations, items in each batch can be divided into one or more subgroups based on a capacity of containers 321A, 321B, 322A, 323A, and 323B. For example, items assigned to the batch 321 can be split between the containers 321A and 321B, which contain five of item a; and two of item b and one each of items c and d, respectively. Similarly, items assigned to the batch 323 can be split between the containers 323A and 323B, which contain each of items h, i, and j; and one of item k, respectively. On the other hand, all of the items assigned to the batch 322 are contained in the container 322A, which indicates that combined weight and volume of the items are within a weight capacity and a volume capacity of the container 322A. Although items in each batch are divided into one or two containers, the number is only exemplary and a batch may contain more than two containers.

Once all of the items in a container are picked, the picker can transfer the container to packing zone 220 via the transport mechanism 214 as described above with respect to FIG. 2. It should be noted, however, that because items in each container may be picked by different pickers, each container may arrive at the packing zone 220 at different times.

In the packing zone 220, rebin workers will receive the containers and sort the items therein onto one or more sorting apparatuses (rebin walls) 330A-C. Although rebin workers are described as human, it should be noted that rebin workers may be implemented as automated machines and not limited to the examples described herein. For example, rebin workers may be implemented as a complex network of conveyor belts or robots configured to sort individual items. For ease of explanation without causing ambiguity, rebin workers are described as individuals hereinafter unless specifically stated otherwise.

In some implementations, the sorting apparatuses 330A-C can comprise one or more of a physical shelving, bookshelves, or an area, where multiple spaces or "cells" are arranged. For example, the sorting apparatuses 330A-C can comprise multiple cells in a grid marked by rows A, B, and C and columns 01, 02, and 03. Other arrangements of spaces and means of identification are also within the scope of the current disclosure. In some implementations, each space or cell in the sorting apparatus 330 can correspond to a particular order or shipment. Once rebin workers sort all purchased items for a particular order into a cell, the rebin worker can finalize the cell, which signals a packer to package the items in the cell into a box and send it out for delivery.

The sorting apparatuses 330A-C depict different states of a same sorting apparatus as rebin workers sort items in the containers 321B, 323A, and 321A onto the sorting apparatus. For example, at the first stage, the sorting apparatus 330A may contain items p and s in cell A02 and item q in cell C01. The items p, s, and q may be portions of other orders that were sorted onto the sorting apparatus 330A from other containers. The other cells in the sorting apparatus 330A: cells A01, A03, B01, B02, B03, C02, and C03 may be empty and not associated with any order.

As rebin workers receive the container 321B and 323A and begin sorting them into the sorting apparatus 330A, the FO system 104 can assign associated orders to different cells. For example, the FO system 104 can assign: the order 312, which correspond to items h and i of the container 323A, to cell A03; order 311, which correspond to items b and c of the container 321B, to cell B01; the order 315, which correspond to items b and j of the containers 321B and 323A, to cell B03; and the order 313, which correspond to item d of the container 321B, to cell C03. The sorting apparatus 330B depicts a state of the sorting apparatus 330A after the rebin workers have finished sorting all items from the containers 321B and 323A.

As rebin workers receive the container 321A and begin sorting again, the FO system 104 can assign each item a from the container 321A to different orders already on the sorting apparatus 330B. In addition, as depicted in the sorting apparatus 330C once the sorting is complete, cells A03, B01, and B03 can contain all items associated with the corresponding the orders 312, 311, and 315, respectively, while cell C03 is still missing items g and k. The containers 322A and 323B will need to arrive at packing zone 220 in order for rebin workers to finish sorting all items of the order 313 and order 313 is ready for packaging.

The operations involve significant re-binning and picking efforts. However, the constraints of hard batch allocation and wall-level dependencies reduce overall efficiency. The system is rigid, with batches tied to specific cells until completely processed, leading to suboptimal utilization and reduced picking efficiency, particularly for multi-item orders. For example, the rebin wall utilization is at 67%, indicating room for improvement in operational efficiency.

The FO system 104 can address these issues by determining a specific number of orders (shipments) from the total pool of orders and determining the optimal sequence for processing these determined orders to enhance efficiency and reduce rebin worker (picker) travel time.

Figure 4:
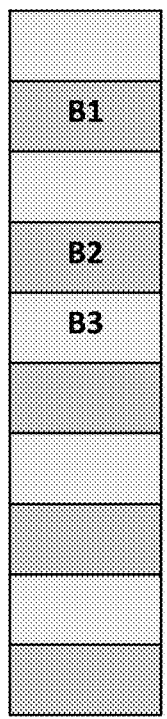
FIG. 4 is a diagram illustrating an example of a picking floor within the picking zone comprising multiple aisles.
Figure 4:
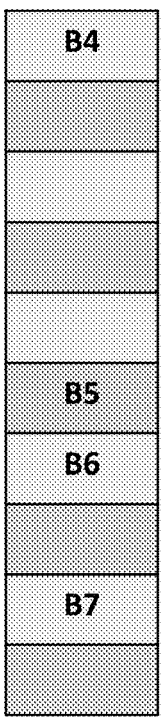
Figure 4:
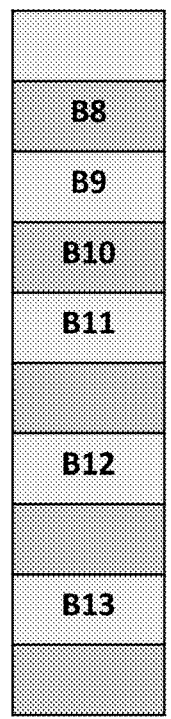
Figure 4:
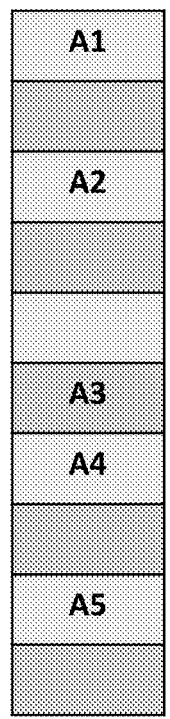
Figure 4:
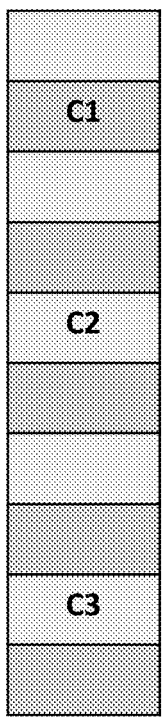
Figure 4:
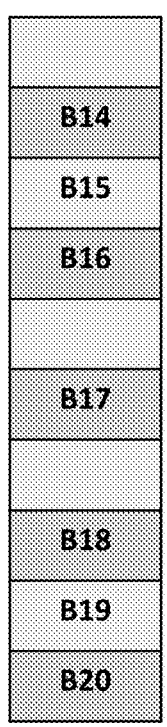
Figure 4:
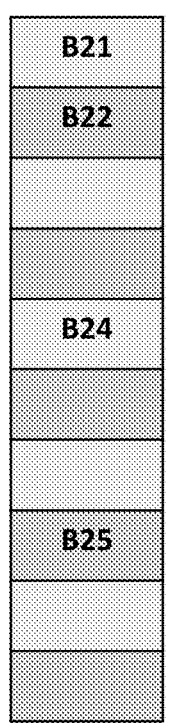
Figure 4:
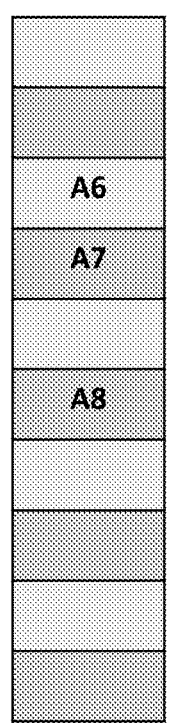
Figure 4:
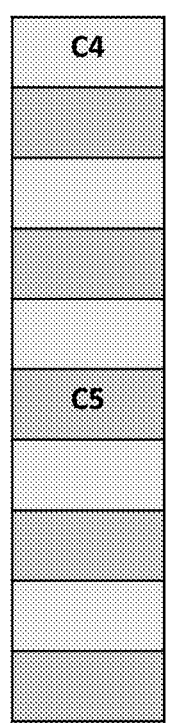
Figure 4:
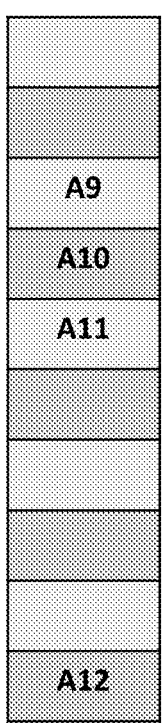

For example, FIG. 4 is a diagram illustrating an example of a picking floor within the picking zone 210 comprising multiple aisles A-J (e.g., storage unit 212). The picking floor can be organized into multiple aisles (labeled A-J) where items (e.g., an item 211 in FIG. 2) are stored for order fulfillment.

During the order fulfillment process, some shipments (orders) may be partially picked, with only certain items gathered while others are still pending. For example, items A1-12, B1-25, and C1-5 can refer to items that have not yet been picked for particular orders. For example, the items A1-12 might be associated with an order within the order set 310, while items B1-25 and C1-5 correspond to orders within other order sets, respectively.

These items A1-12, B1-25, and C1-5 can be scheduled to be received at corresponding sorting apparatuses, which are designated areas where items picked from various aisles are temporarily stored. FIG. 5, for example, illustrates sorting apparatuses each receiving a corresponding order set, with a sorting apparatus 331 receiving items A1-12, a sorting apparatus 332 receiving items B1-25, and a sorting apparatus 333 receiving items C1-5.

By fully utilizing the sorting apparatuses 331-333, a method is proposed for strategically selecting shipments for remaining cells, focusing on maximizing pick density around existing pending picks. This approach can minimize travel time and increase efficiency in the picking process. For example, the FO system 104 can optimize the picking process by clustering picks around areas with existing pending picks (e.g., the items A1-12, B1-25, and C1-5). This clustering not only improves operational efficiency but also helps in balancing the workload across different pickers and aisles, reducing bottlenecks.

Figure 6:
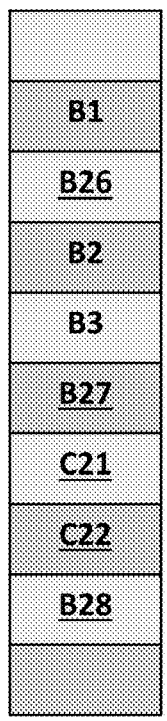
FIG. 6 is a diagram illustrating an example of a picking floor within the picking zone to which shipments (orders) for remaining cells of the sorting apparatus are selected in a manner that maximizes pick density around pending picks.
Figure 6:
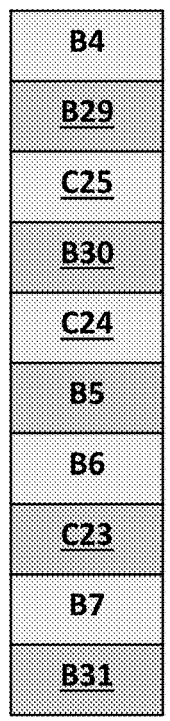
Figure 6:
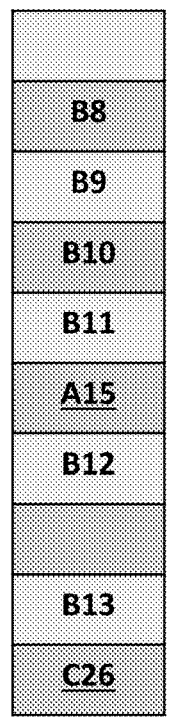
Figure 6:
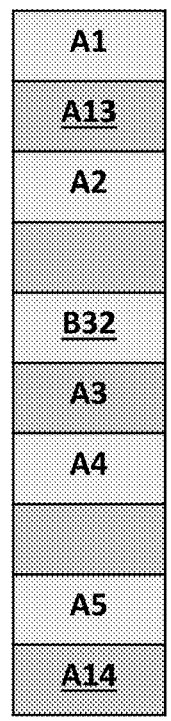
Figure 6:
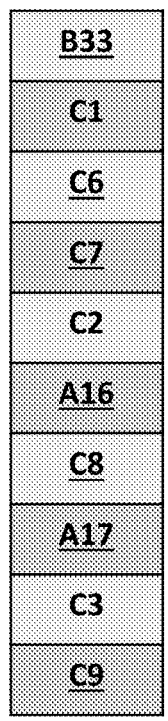
Figure 6:
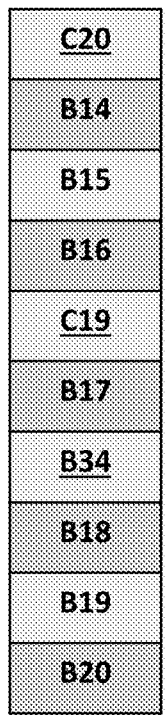
Figure 6:
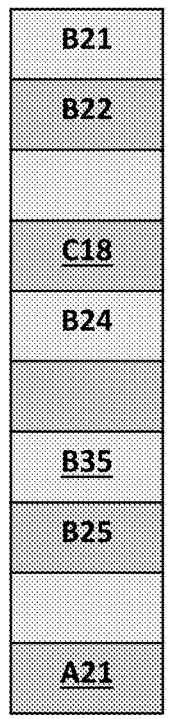
Figure 6:
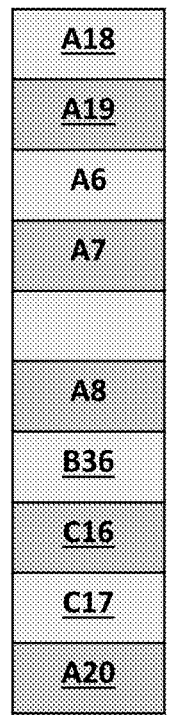
Figure 6:
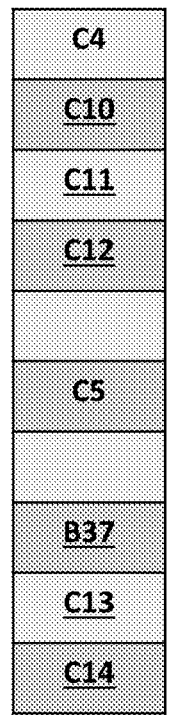
Figure 6:
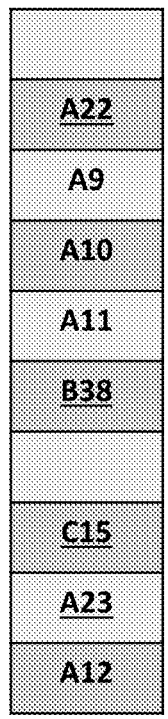

For example, FIG. 6 is a diagram illustrating an example of a picking floor within the picking zone 210, which includes multiple aisles A-J to which shipments (orders) for remaining cells of the sorting apparatus 331-333 are selected in a manner that maximizes pick density around pending picks. This selection strategy enhances operational efficiency by clustering picks near existing pending picks, reducing travel time, and streamlining the picking process. This method also allows for dynamic adjustment of the picking strategy based on real-time order flow and inventory levels. FIG. 7 provides an example of the sorting apparatuses 331-333 with the remaining cells filled through this selection process, demonstrating the efficiency of the system.

The FO system 104 can select items close to the pending picks depicted in FIG. 4. For example, the FO system 104 can recognize that the aisle D has some pending picks for the orders to be received at the sorting apparatus 331 and select additional items (e.g., A13 and A14) from the aisle D for remaining orders to fill the cells of the sorting apparatus 331. This proximity-based selection can help in reducing the time pickers spend moving between aisles, further optimizing the picking process.

Similarly, the FO system 104 can identify that the aisle A has pending picks for orders to be received at the sorting apparatus 332 and select items (e.g., B26, B27, and B28) from the aisle A for remaining orders to fill the cells of the sorting apparatus 332. By doing so, the FO system 104 can ensure that the picking process is as efficient as possible, with minimal disruptions or delays.

As described above with respect to FIGS. 2 and 3, the pickers can receive an instruction on the device to retrieve one or more items 211 from storage unit 212, which indicates that the item is allocated to the sorting apparatus. The FO system 104 can use real-time data to direct pickers, ensuring that the remaining cells of the sorting apparatuses 331-333 are filled efficiently based on the pending pick locations and the orders. This real-time guidance ensures that pickers are always working on the most efficient tasks, reducing idle time and increasing throughput.

For example, the FO system 104 can determine the number of remaining cells to be filled within each sorting apparatus and identify the nearest orders corresponding to the number of remaining cells to minimize picker travel within the picking floor. The FO system 104 can evaluate each order and pick density for each sorting apparatus, determining whether an order should be assigned to the remaining cells. If an order is to be assigned, the FO system 104 can determine which sorting apparatus should receive the items based on what is pending for that sorting apparatus and the locations of other orders in the backlog. This decision-making process can be informed by historical data, current order priorities, and real-time inventory levels, ensuring that the most critical orders are processed first.

In some implementations, the FO system 104 can be configured to execute a process that iteratively identifies unfulfilled orders and assigns them to particular collection devices or pickers such that the order fulfilment process is fast and efficient. For example, unfulfilled orders can be selected and assigned to cells of various sorting apparatuses to optimize an efficiency metric that accounts for component items of the unfulfilled orders to be retrieved from a low number of aisles, while retrieving as many items as possible from each aisle by a particular collection device. In some cases, this promotes efficiency by reducing the number of aisles that a particular collection device has to traverse. Further, by assigning collections from a particular aisle to the same sorting apparatus to the extent possible, delivery of the collected items to the sorting apparatuses can also be streamlined. In addition, by iterating the optimization process intermittently, e.g., when a collection device is filled to capacity, or when a collection device completes an assigned task, the efficiency can be maintained/improved by an adaptive process. Such an adaptive process that promotes efficiency of the fulfillment tasks can improve various operating parameters of a fulfillment center including, for example, overall fulfillment time or individual orders, throughput, order fulfillment rate, power consumption associated with the fulfillment process, etc.

The FO system 104 can further analyze picker's location to fill the cells of the sorting apparatuses. For example, the picker may have scanned a barcode at an aisle among aiels A-J when he has picked an item from the aisle to thereby allow the FO system 104 to identify a location of the picker within the picking floor based on the picker's scan within the picking floor.

Based on the picker's location, the FO system 104 can assign pick tasks to the picker to retrieve one or more items within the picking floor. For example, the FO system 104 can assign a pick task by calculating a distance traveled per picked unit (DPU) based on (i) a sorting apparatus to receive the items, (ii) a distance from the location of the picker to a first location in aisle, (iii) a distance within the aisle, and (iv) a number of units to be picked. The DPU can be calculated by dividing a sum of (i) a distance to a first location in aisle and (ii) a distance within the aisle by a number of units picked from the aisle for each aisle and a corresponding sorting apparatus.

For example, if a distance from a first picker to a first location in aisle F is 5.2 to retrieve items associated with the sorting apparatus 331 and the distance within the aisle F to retrieve 3 units is 2.3, the DPU is calculated as (5.2+2.3)/3=2.5. By way of further example, if a distance from a second picker to a first location in aisle B is 6.3 to retrieve items associated with the sorting apparatus 332 and the distance within the aisle B to retrieve 3 units is 2.1, the DPU is calculated as (6.3+2.1)/3=2.8.

The FO system 104 can perform the calculations iteratively for each aisle and for each picker. These calculations are triggered whenever any picker in the FC 200 has fewer than X pick locations in their queue, where X is determined based on the time required to perform the calculations (e.g., typically X=3). Based on the calculation, the FO system 104 can assign a pick task with the least DPU to each picker. In some implementations, the FO system 104 can assign the picker to retrieve all items associated with the same sorting apparatus from the aisle. Once all items associated with the same sorting apparatus are retrieved from the aisle, the FO system 104 can calculate the DPU again for the picker to retrieve items. For example, the FO system 104 can assign a new pick task when the container is filled (e.g., containers 321A, 321B, 322A, 323A, and 323B described with respect to FIG. 3) based on partially picked shipment. In some implementations, the container only receives items from the same order set. For example, only items associated with the order set 310, which are scheduled to be contained in the sorting apparatus 331, are received in a container. In some implementations, if the picker's location is unknown, the distance to the aisle is omitted from the DPU calculation and the picker is assigned to a pick task with the lowest DPU.

Figure 8:
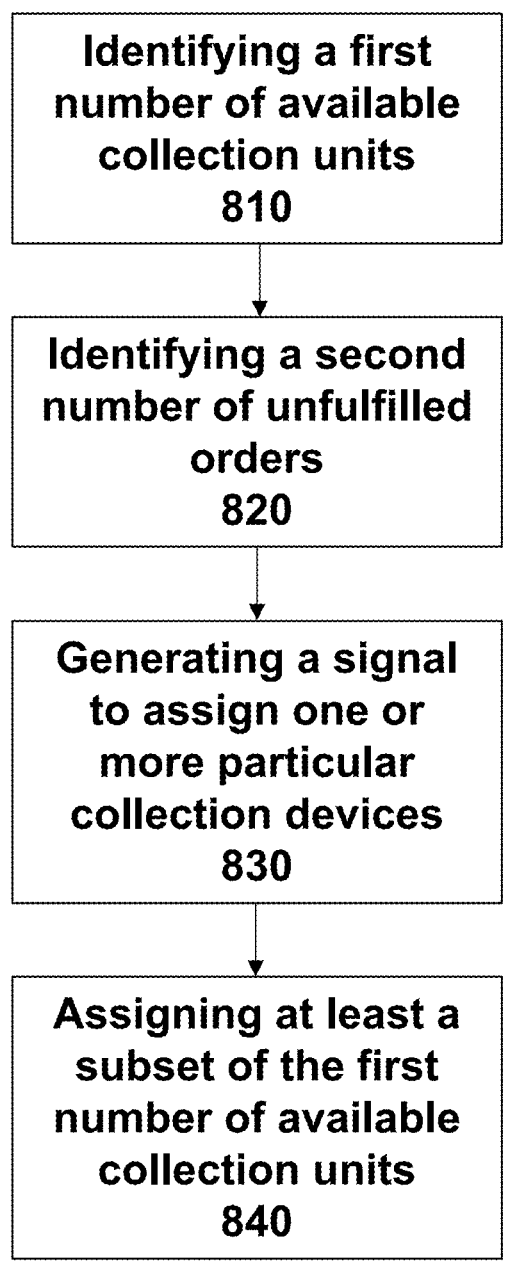
FIG. 8 is a flowchart showing an exemplary process for order fulfillment at a fulfillment center.

FIG. 8 is a flowchart showing an exemplary process 800 for an order fulfillment process. As discussed above, at least a portion of the process 800 can be performed by various elements of the FO system 104.

Operations of the process 800 can include identifying, within a first order collection area of the fulfillment center, a first number of available collection units available for processing a corresponding first number of orders (810). For example, the FO system 104 can pull a list of pending orders that need to be processed, which could be from various sources such as online sales, bulk shipments, or replenishment orders. In some implementations, the FO system 104 can identify, within the picking zone 210 of the FC 200, a number of available collection units (e.g., sorting apparatuses) available for processing a corresponding first number of orders. In some implementations, the FO system 104 can also determine the status of each item in the order-whether it has been picked, partially picked, or is still pending.

Operations of the process 800 can include identifying, from a list of unfulfilled orders at the fulfillment center, a second number of unfulfilled orders, each of which is to be assigned to one of the first number of available collection units for packing (820). For example, the FO system 104 can identify, from a list of unfulfilled orders at the FC 200, a number of unfulfilled orders each of which is to be assigned to one of the first number of available sorting apparatus for packing. In some implementations, a fulfillment process for each order can include: (i) collecting one or more component items from a storage area comprising multiple aisles, each aisle having a plurality of locations for storing order-items and (ii) delivering collected one or more component items to a corresponding collection unit. For example, to perform a fulfillment process for each order within the order set 310, (i) one or more items can be collected from the picking zone 210 with multiple aisles A-J (see FIGS. 4 and 6) and (ii) a picker (rebin worker) can deliver the collected one or more items to a corresponding sorting apparatus (e.g., one of sorting apparatus 331, 332, or 333).

In some implementations, the number of unfulfilled orders can be selected such that an efficiency metric associated with the second number of unfulfilled orders satisfies a threshold condition, where the efficiency metric is based on (i) a total distance traversed by a collection device to collect the component items corresponding to the number of unfulfilled orders from the storage area and (ii) a third number of component items collected using the collection device traversing the total distance. For example, the FO system 104 can select the number of unfulfilled orders such that a calculated DPU (an efficiency metric) is less than a predefined threshold number. For example, if the calculated DPU is 2.5 and the predefined threshold number is 3, the order is selected to be assigned to one of the sorting apparatuses. As discussed above, the DPU can be calculated based on (i) a total distance traversed by a picker (a collection device) to collect the component items corresponding to the number of unfulfilled orders from the picking zone 210 and (ii) a number of items collected by the picker traversing the total distance. Based on the efficiency metric, the FO system 104 can select a number of unfulfilled orders, ensuring that the unfulfilled orders are selected from the total orders in a way that minimizes travel time and balances the workload among the pickers.

In some implementations, the efficiency metric can also be based on a total time associated with traversing the total distance and delivering the collected number of component items to the assigned collection unit. For example, the DPU metric can be calculated based on a total time associated with a picker traversing the total distance and delivering the collected items to the assigned sorting apparatus. In some implementations, the efficiency metric can be recalculated upon detection of occurrence of predetermined events, which include reaching of a capacity associated with a collection device (a tote of picker).

Operations of the process 800 can include generating a signal to assign one or more particular collection devices from a pool of candidate collection devices to collect the third number of component items, where the particular collection devices are assigned based on location information corresponding to each collection device in the pool of candidate collection devices (830). For example, the FO system 104 can generate a signal to assign one or more particular collection devices (pickers) from a pool of candidate collection devices to collect the number of component items. For example, the generated signal can cause a device of a picker to inform the picker that the picker is assigned to retrieve items from the picking zone 209.

In some implementations, the location information corresponding to each collection device in the pool of candidate collection devices is derived based on a last-known location of the corresponding collection device. For example, as discussed above, the FO system 104 can recognize a location of the picker based on the scanned barcode. In some implementations, the location information corresponding to each collection device in the pool of candidate collection devices is received from the corresponding collection device in response to transmitting a request for the location information. For example, the FO system 104 can transmit, to a device of a picker, a request for location information and the device can transmit the location information in response.

Operations of the process 800 can include assigning at least a subset of the first number of available collection units to receive each of the third number of component items corresponding to the second number of unfulfilled orders (840). For example, the FO system 104 can assign at least a subset of the number of sorting apparatuses to receive each of the component items corresponding to the number of unfulfilled orders.

In some implementations, the FO system 104 can continuously monitor the status of orders, inventory levels, and picker locations in real-time. If there are changes in order priorities, inventory levels, or picker availability, the FO system 104 can dynamically reassign tasks to ensure continued efficiency. For example, the FO system 104 can use a feedback loop to evaluate the efficiency of the current process and make adjustments as needed. This could involve reassigning pickers, adjusting task sequences, or reallocating items to different sorting apparatus cell. The FO system 104 can adapt to unexpected changes, such as sudden increases in order volume or temporary shortages of certain items, by reallocating resources and adjusting the picking strategy.

In some implementations, the FO system 104 can ensure that all items for each order set are correctly retrieved and placed in the sorting apparatus. For example, the FO system 104 can track the progress of each order set, ensuring that all items have been picked and placed in the correct sorting apparatus cells. The FO system 104 can ensure that each sorting apparatus cell contains only items from the same order set, maintaining the integrity of the order. Once an order set is complete, the FO system 104 marks it as ready for dispatch, ensuring that it is processed for shipping or further handling.

The FO system 104 can repeat the process 800 to ensure all orders are processed and all cells are filled. For example, after completing each batch of orders, the FO system 104 can reevaluate the remaining orders and inventory levels to determine the next steps. The process can be repeated in batches, with each batch focusing on a new set of orders and optimizing the picking and sorting tasks for that batch. The FO system 104 can adapt to changes in order volume, inventory levels, and operational demands, ensuring that the process remains efficient and effective. The FO system 104 can continue the iterative process until all orders are processed, and all sorting apparatus cells are filled.

Figure 9:
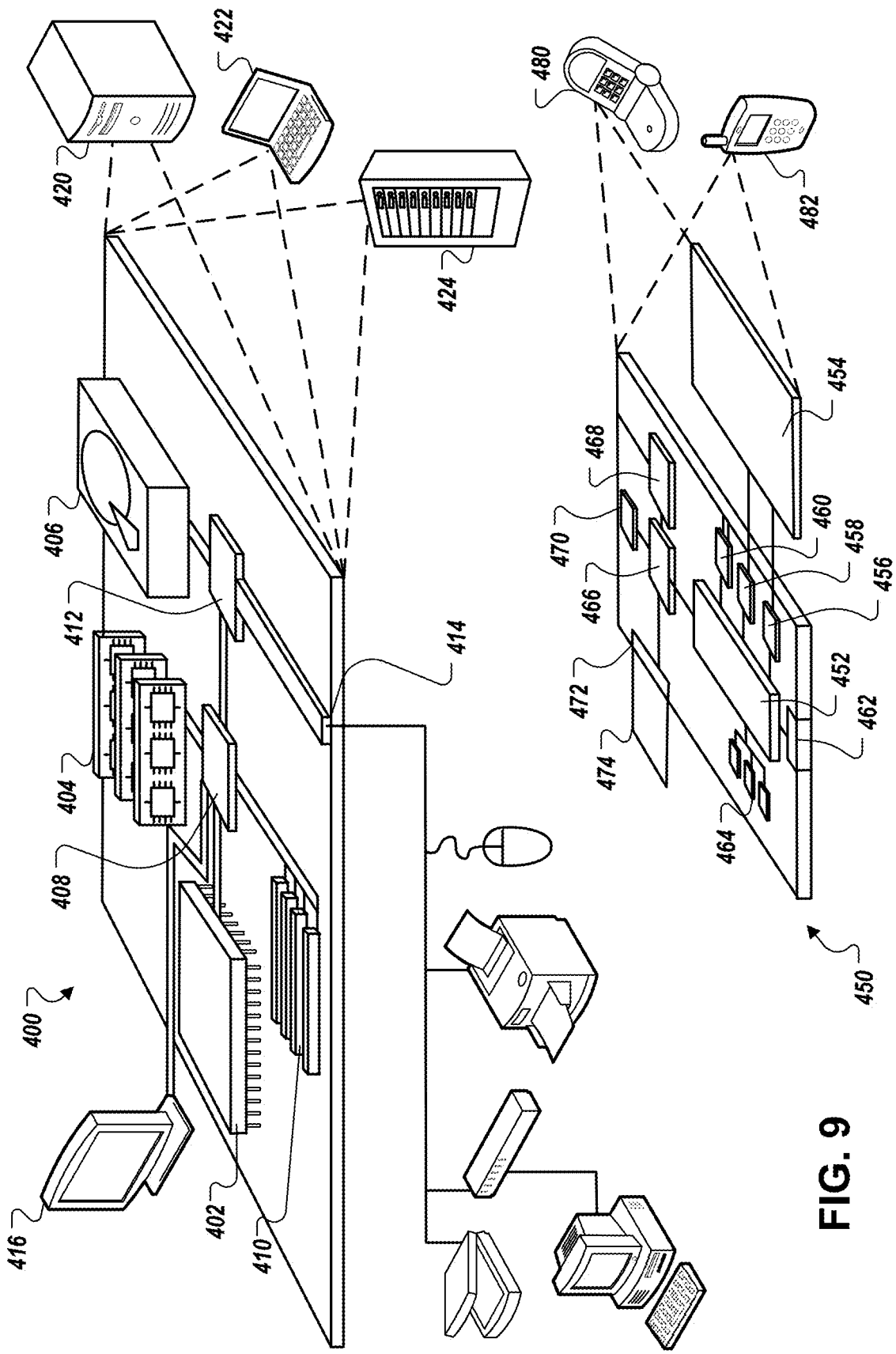
FIG. 9 is a diagram illustrating a computing system that can be used in connection with computer-implemented methods described in this specification.

FIG. 9 shows an example of a computing device 400 and a mobile computing device 450 (also referred to herein as a wireless device) that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smartphones, AR devices, and other similar computing devices. The components shown here, their connections and relationships, and their functions, are meant to be examples only, and are not meant to be limiting. The computing device 400 and/or the mobile computing device 450 can form at least a portion of the application installation environment described above.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 9. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing devices 400 and the mobile computing device 450, and an entire system may be made up of multiple computing devices communicating with each other. The computing device 400 may be implemented in the plurality of systems described with respect to FIGS. 1-8.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 9. For example, it may be implemented in the devices and mobile devices described with respect to FIGS. 1-8. Other implementations may include a phone device 480 or 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Although a few implementations have been described in detail above, other modifications may be made without departing from the scope of the inventive concepts described herein, and, accordingly, other implementations are within the scope of the following claims.

What is claimed is:

1. A method of order fulfillment at a fulfillment center performed by at least one processor of a computer-implemented fulfillment optimization (FO) system, the method comprising:
    identifying, within a first order collection area of the fulfillment center, a first number of available collection units available for processing a corresponding first number of orders;
    identifying, from a list of unfulfilled orders at the fulfillment center, a second number of unfulfilled orders, each of which is to be assigned to one of the first number of available collection units for packing, wherein a fulfillment process for each order includes: (i) collecting one or more component items from a storage area comprising multiple aisles, each aisle having a plurality of locations for storing order-items, and (ii) delivering the collected one or more component items to a corresponding collection unit;
    generating a signal to assign one or more particular collection devices connected with the computer-implemented FO system using a network from a pool of candidate collection devices to collect a third number of component items corresponding to the second number of unfulfilled orders, wherein the one or more particular collection devices are assigned based on location information corresponding to each collection device in the pool of candidate collection devices;
    causing a transmission of the signal, via the network, to the one or more particular collection devices, to thereby cause each of the one or more particular collection devices to initiate navigation to a corresponding storage location within the storage area and collect the third number of component items corresponding to the second number of unfulfilled orders; and
    assigning at least a subset of the first number of available collection units to receive each of the third number of component items corresponding to the second number of unfulfilled orders,
    wherein identifying the second number of unfulfilled orders includes:
        calculating an efficiency metric for each of the unfulfilled orders by dividing (i) a total distance traversed by a respective collection device, selected from the first number of available collection units, to collect component items for the unfulfilled orders by (ii) a number of the component items collected by the respective collection device traversing the total distance;
        determining whether the efficiency metric associated with each of the unfulfilled orders satisfies a threshold condition, wherein the threshold condition is satisfied based on a determination that the efficiency metric is less than a predefined threshold number; and
        based on the determination that the efficiency metric satisfies the threshold condition, selecting, from the list of unfulfilled orders at the fulfillment center, the second number of unfulfilled orders.

2. The method of claim 1, wherein the efficiency metric is also based on a total time associated with traversing the total distance and delivering the collected third number of component items to the assigned collection unit.

3. The method of claim 1, wherein the location information corresponding to each collection device in the pool of candidate collection devices is derived based on a last-known location of the corresponding collection device.

4. The method of claim 1, wherein the location information corresponding to each collection device in the pool of candidate collection devices is received from the corresponding collection device in response to transmitting a request for the location information.

5. The method of claim 1, wherein the efficiency metric is recalculated upon detection of occurrence of predetermined events.

6. The method of claim 5, wherein the predetermined events comprise reaching of a capacity associated with a collection device.

7. The method of claim 1, further comprising iterating the method until each of the first number of available collection units is assigned to at least one of the second number of unfulfilled orders.

8. A computer-implemented system for order fulfillment at a fulfillment center, the system comprising:
    at least one processor; and
    memory coupled to the at least one processor and storing instructions that, based on being executed by the at least one processor, perform operations comprising:
        identifying, within a first order collection area of the fulfillment center, a first number of available collection units available for processing a corresponding first number of orders;
        identifying, from a list of unfulfilled orders at the fulfillment center, a second number of unfulfilled orders, each of which is to be assigned to one of the first number of available collection units for packing, wherein a fulfillment process for each order includes: (i) collecting one or more component items from a storage area comprising multiple aisles, each aisle having a plurality of locations for storing order-items, and (ii) delivering the collected one or more component items to a corresponding collection unit;
        generating a signal to assign one or more particular collection devices connected with the computer-implemented system using a network from a pool of candidate collection devices to collect a third number of component items corresponding to the second number of unfulfilled orders, wherein the one or more particular collection devices are assigned based on location information corresponding to each collection device in the pool of candidate collection devices;

causing a transmission of the signal, via the network, to the one or more particular collection devices, to thereby cause each of the one or more particular collection devices to initiate navigation to a corresponding storage location within the storage area and collect the third number of component items corresponding to the second number of unfulfilled orders; and assigning at least a subset of the first number of available collection units to receive each of the third number of component items corresponding to the second number of unfulfilled orders, wherein identifying the second number of unfulfilled orders includes:

calculating an efficiency metric for each of the unfulfilled orders by dividing (i) a total distance traversed by a respective collection device, selected from the first number of available collection units, to collect component items for the unfulfilled orders by (ii) a number of the component items collected by the respective collection device traversing the total distance;

determining whether the efficiency metric associated with each of the unfulfilled orders satisfies a threshold condition, wherein the threshold condition is satisfied based on a determination that the efficiency metric is less than a predefined threshold number; and based on the determination that the efficiency metric satisfies the threshold condition, selecting, from the list of unfulfilled orders at the fulfillment center, the second number of unfulfilled orders.

9. The computer-implemented system of claim 8, wherein the efficiency metric is also based on a total time associated with traversing the total distance and delivering the collected third number of component items to the assigned collection unit.

10. The computer-implemented system of claim 8, wherein the location information corresponding to each collection device in the pool of candidate collection devices is derived based on a last-known location of the corresponding collection device.

11. The computer-implemented system of claim 8, wherein the location information corresponding to each collection device in the pool of candidate collection devices is received from the corresponding collection device in response to transmitting a request for the location information.

12. The computer-implemented system of claim 8, wherein the efficiency metric is recalculated upon detection of occurrence of predetermined events.

13. The computer-implemented system of claim 12, wherein the predetermined events comprise reaching of a capacity associated with a collection device.

14. The computer-implemented system of claim 8, wherein the operations further comprise iterating the operations until each of the first number of available collection units is assigned to at least one of the second number of unfulfilled orders.

15. A non-transitory recording medium storing a program, wherein execution of the program causes one or more computers to perform operations comprising:

identifying, within a first order collection area of a fulfillment center, a first number of available collection units available for processing a corresponding first number of orders;

identifying, from a list of unfulfilled orders at the fulfillment center, a second number of unfulfilled orders, each of which is to be assigned to one of the first number of available collection units for packing, wherein a fulfillment process for each order includes: (i) collecting one or more component items from a storage area comprising multiple aisles, each aisle having a plurality of locations for storing order-items, and (ii) delivering the collected one or more component items to a corresponding collection unit;

generating a signal to assign one or more particular collection devices connected with the one or more computers using a network from a pool of candidate collection devices to collect a third number of component items corresponding to the second number of unfulfilled orders, wherein the one or more particular collection devices are assigned based on location information corresponding to each collection device in the pool of candidate collection devices;

causing a transmission of the signal, via the network, to the one or more particular collection devices, to thereby cause each of the one or more particular collection devices to initiate navigation to a corresponding storage location within the storage area and collect the third number of component items corresponding to the second number of unfulfilled orders; and assigning at least a subset of the first number of available collection units to receive each of the third number of component items corresponding to the second number of unfulfilled orders, wherein identifying the second number of unfulfilled orders includes:

calculating an efficiency metric for each of the unfulfilled orders by dividing (i) a total distance traversed by a respective collection device, selected from the first number of available collection units, to collect component items for the unfulfilled orders by (ii) a number of the component items collected by the respective collection device traversing the total distance;

determining whether the efficiency metric associated with each of the unfulfilled orders satisfies a threshold condition, wherein the threshold condition is satisfied based on a determination that the efficiency metric is less than a predefined threshold number; and based on the determination that the efficiency metric satisfies the threshold condition, selecting, from the list of unfulfilled orders at the fulfillment center, the second number of unfulfilled orders.

16. The non-transitory recording medium of claim 15, wherein the efficiency metric is also based on a total time associated with traversing the total distance and delivering the collected third number of component items to the assigned collection unit.

17. The non-transitory recording medium of claim 15, wherein the location information corresponding to each collection device in the pool of candidate collection devices is derived based on a last-known location of the corresponding collection device.

18. The non-transitory recording medium of claim 15, wherein the location information corresponding to each collection device in the pool of candidate collection devices is received from the corresponding collection device in response to transmitting a request for the location information.

19. The non-transitory recording medium of claim 15, wherein the efficiency metric is recalculated upon detection of occurrence of predetermined events, and wherein the predetermined events comprise reaching of a capacity associated with a collection device.

20. The non-transitory recording medium of claim 15, wherein the operations further comprise iterating the operations until each of the first number of available collection units is assigned to at least one of the second number of unfulfilled orders.

\* \* \* \* \*